W. P. DALLY.
NUT LOCK.
APPLICATION FILED SEPT. 27, 1911.

1,029,670.

Patented June 18, 1912.

Witnesses

Wendell P. Dally,
Inventor
by C. A. Snow & Co.
Attorneys

UNITED STATES PATENT OFFICE.

WENDELL P. DALLY, OF HOPE, ARKANSAS.

NUT-LOCK.

1,029,670.   Specification of Letters Patent.   Patented June 18, 1912.

Application filed September 27, 1911. Serial No. 651,621.

*To all whom it may concern:*

Be it known that I, WENDELL P. DALLY, a citizen of the United States, residing at Hope, in the county of Hempstead and State of Arkansas, have invented a new and useful Nut-Lock, of which the following is a specification.

This invention relates to nut locks, its object being to provide a pawl and ratchet for holding a nut against rotation relative to the bolt, means being employed whereby the pawl can be readily disengaged from the ratchet by means of a suitable tool.

A further object is to provide a nut lock which is simple in construction, compact and efficient.

A further object is to provide a nut lock utilizing a washer of novel form which constitutes one of the locking elements.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
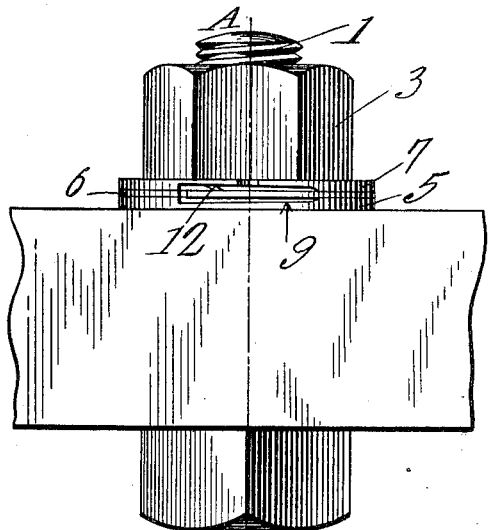
Figure 2:
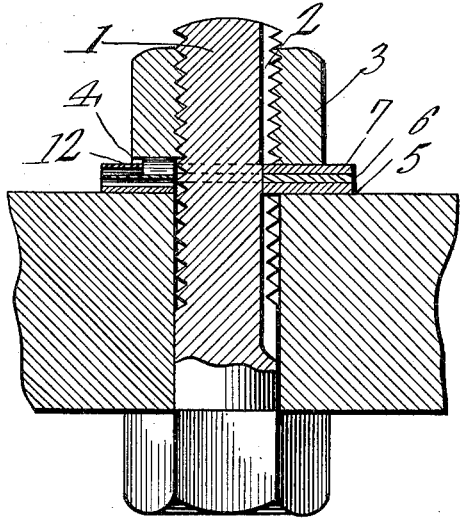
Figure 3:
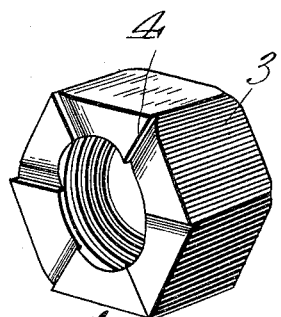
Figure 4:
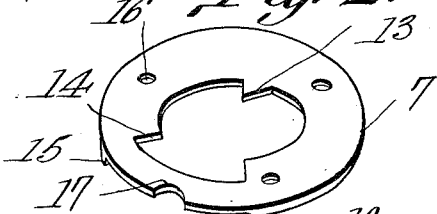
Figure 4:
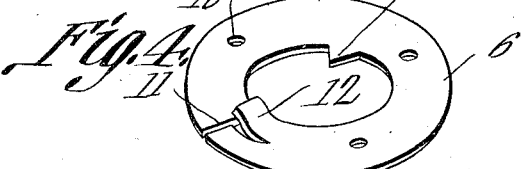
Figure 5:
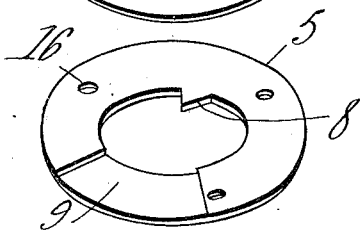

In said drawings:—Figure 1 is an elevation of the nut lock applied to a structure. Fig. 2 is a section through the parts shown in Fig. 1, said section being taken on the line A—B, a portion of the bolt being shown in elevation. Fig. 3 is a perspective view of the nut and showing the ratchet teeth thereon. Fig. 4 is a perspective view of the washer, the parts thereof being shown separated. Fig. 5 is a detail view of a releasing tool adapted to be used with the lock when arranged within a wheel hub and upon an axle.

Referring to the figures by characters of reference 1 designates a bolt having a groove 2 extending longitudinally within the threaded portion thereof, said bolt being adapted to be engaged by a nut 3 the inner face of which is formed with a series of ratchet teeth 4. The washer used in connection with the nut is made up of three sections indicated at 5, 6 and 7 respectively. The base washer 5 has a projection 8 extending inwardly therefrom and adapted to fit within the groove 2. Formed within one face of this washer is a segmental recess 9. The intermediate section 6 of the washer is also formed with a projection 10, adapted to be seated within the groove 2 and this section is split, as at 11, there being a lip 12 struck upwardly from one end portion of the section so as to constitute a pawl as will be hereinafter set forth. The third or top section of the washer, which has been indicated at 7, has a projection 13 adapted to be seated within the groove 2 and formed within this section at a point opposite the projection 13 is a slot 14 opening into the central opening in the section and this slot is of a width slightly greater than the width of the pawl 12. A recess 15 is formed in that face of the section 7 contacting with the intermediate section 6, this recess being similar to the recess 9. The three sections 5, 6 and 7 of the washer are adapted to be assembled with the projections 8, 10 and 13 in alinement after which said sections can be secured together by means of rivets extending through openings 16, or by welding the sections together. When the parts are thus assembled the pawl 12 is located between the recess 9 and the slot 14 and projects normally through said slot, that portion of the section 6 at one side of the pawl being free to spring either downwardly in the recess 9 or upwardly into recess 15.

In using the nut lock, the washer is placed on the threaded end of the bolt 1 so that the projections 8, 10 and 13 will be seated within the groove 2. The nut 3 is then screwed onto the bolt, its toothed face being toward the washer. As the nut is brought into contact with the washer, the teeth 4 thereon will slip over the outwardly projecting end of the pawl 12 which pawl, as hereinbefore stated, normally projects upwardly through the slot 14. It will be understood of course that after one or more of the teeth 4 have engaged and slipped past the pawl 12, the nut 3 will be locked against unscrewing from the bolt. Should it be desired to release the nut from the bolt, it is merely necessary to insert a thin knife blade or the like into the recess 15 and to then move it against the upper or back face of the pawl 12 so as to press the pawl downwardly into the slot 14 and the adjacent end of the section 6 downwardly into the recess 9. Pawl 12 will thus be removed from the path of the teeth 4 and the nut 3 can thus be unscrewed without hindrance.

The lock herein described can of course be used upon bolts employed for different purposes. The lock is especially useful upon the axles of wagons and the like. When thus employed, the section 7 of the washer is preferably formed with a substantially semicircular recess 17 opening into the recess 15. It is thus possible to extend a suitable tool having L-shaped head, end first into the hub and the recess 17 and to then turn the tool so as to bring its head against the back of the pawl 12 and depress the pawl out of the path of the teeth 4. A tool suitable for this purpose has been illustrated in Fig. 5, although it is to be understood that other forms of devices may be employed if desired.

What is claimed is:—

1. A nut lock including a longitudinally grooved bolt, a nut mounted for rotation on the bolt and having ratchet teeth upon one face thereof, a washer upon the bolt, said washer including a split central section having a pawl on one end normally projecting beyond one face of the washer, there being a recess within the washer for the reception of the pawl carrying end of the split section when the pawl is retracted into the washer, and another recess for the reception of means for retracting the pawl, and means upon the washer for entering the groove in the bolt.

2. A nut lock including a longitudinally grooved bolt, a nut mounted for rotation on the bolt and having ratchet teeth upon one face thereof, a washer upon the bolt, said washer including a split central section having a pawl on one end normally projecting beyond one face of the washer, there being a recess within the washer for the reception of the pawl carrying end of the split section when the pawl is retracted into the washer, and another recess for the reception of means for retracting the pawl, said pawl being formed upon the inner corner of said end portion of the split section and all portions of the outer periphery of said split section being normally parallel with the faces of the washer, and means upon the washer for entering the groove in the bolt.

3. A nut lock including a bolt, a nut thereon and having a toothed face, and a washer mounted on the bolt, said washer including a base section having a recess in one face, a top section having a recess in one face and a slot opening into the recess, a split intermediate section interposed between the recessed faces of the top and bottom sections and having a pawl extending from the inner corner of one end portion thereof and through the slot in the top section, and means upon the sections for engaging the bolt to hold the sections against rotation independently of the bolt.

4. A lock washer including a base section having a recess in one face, a top section having a recess in one face and a slot opening into the recess, a split intermediate section interposed between the recessed faces of the base and top sections, the ends of said split section being located adjacent one end of the recesses, a pawl extending from the inner corner portion of one end of the split section and normally extending through the slot in the top section, the pawl carrying end of said split section being depressible into the recess in the base section to retract the pawl into the slot in the top section, and means upon one of the sections for engaging a bolt and to hold the section against rotation thereon, all of said sections being fixedly connected.

In testimony that I claim the foregoing as my own, I have hereto affixed my signature in the presence of two witnesses.

WENDELL P. DALLY.

Witnesses:
S. H. BRIANT,
W. M. CAULLEY.

---

Copies of this patent may be obtained for five cents each, by addressing the "Commissioner of Patents, Washington, D. C."